US011785090B2

(12) United States Patent
Li et al.

(10) Patent No.: US 11,785,090 B2
(45) Date of Patent: Oct. 10, 2023

(54) LINKAGE CONTROL SYSTEM AND METHOD, STORAGE MEDIUM, AND ELECTRONIC DEVICE

(71) Applicant: BYD COMPANY LIMITED, Guangdong (CN)

(72) Inventors: Jin Li, Shenzhen (CN); Zuntao Huang, Shenzhen (CN); Gengtian Yang, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 7 days.

(21) Appl. No.: 17/640,599

(22) PCT Filed: Sep. 4, 2020

(86) PCT No.: PCT/CN2020/113472
§ 371 (c)(1),
(2) Date: Mar. 4, 2022

(87) PCT Pub. No.: WO2021/043259
PCT Pub. Date: Mar. 11, 2021

(65) Prior Publication Data
US 2022/0345527 A1    Oct. 27, 2022

(30) Foreign Application Priority Data

Sep. 6, 2019  (CN) .......................... 201910844374.4

(51) Int. Cl.
H04L 67/12    (2022.01)
G06F 9/54    (2006.01)
H04L 41/12    (2022.01)

(52) U.S. Cl.
CPC .............. *H04L 67/12* (2013.01); *G06F 9/546* (2013.01); *H04L 41/12* (2013.01)

(58) Field of Classification Search
None
See application file for complete search history.

(56) References Cited

U.S. PATENT DOCUMENTS

2016/0065653 A1    3/2016  Chen et al.
2017/0048359 A1    2/2017  Wagner et al.
(Continued)

FOREIGN PATENT DOCUMENTS

CN    105159150 A    12/2015
CN    105388779 A    3/2016
(Continued)

OTHER PUBLICATIONS

International Search Report and Written Opinion for Application No. PCT/CN2020/113472, dated Nov. 27, 2020, 9 pages.

*Primary Examiner* — Charles E Anya

(57) ABSTRACT

A linkage control system, a method, a storage medium, and an electronic device are provided. The system includes: a trigger access module, configured to obtain a linkage trigger signal satisfying a linkage trigger condition; first MQTT middleware, connected to the trigger access module and the linkage engine module, and configured to send the linkage trigger signal to the linkage engine module; a linkage manner database, configured to store a linkage manner; a linkage engine module, connected to the linkage manner database, and configured to determine a target linkage manner according to the linkage trigger signal; and second MQTT middleware, connected to the linkage engine module, and configured to be connected to N devices, and send a control instruction to the target device according to the target linkage manner determined by the linkage engine module, so that the target device performs an action corresponding to the control instruction.

11 Claims, 4 Drawing Sheets

(56) References Cited

U.S. PATENT DOCUMENTS

2017/0284691 A1* 10/2017 Sinha ..................... F24F 11/77
2018/0011694 A1* 1/2018 Al-Fuqaha ................ G06F 8/36
2018/0115616 A1* 4/2018 Srinivasan ............ H04L 67/141

FOREIGN PATENT DOCUMENTS

| CN | 106131110 A |   | 11/2016 |           |
|----|-------------|---|---------|-----------|
| CN | 106412050 A |   | 2/2017  |           |
| CN | 106559296 A |   | 4/2017  |           |
| CN | 106656632 A |   | 5/2017  |           |
| CN | 107612710 A | * | 1/2018  | H04L 12/24 |
| CN | 109361594 A |   | 2/2019  |           |
| CN | 109548247 A |   | 3/2019  |           |

* cited by examiner

LINKAGE CONTROL SYSTEM AND METHOD, STORAGE MEDIUM, AND ELECTRONIC DEVICE

CROSS-REFERENCE TO RELATED APPLICATIONS

This application is a National Phase Application of International Patent Application No. PCT/CN2020/113472, filed on Sep. 4, 2020, which is based on and claims priority to and benefits of Chinese Patent Application 201910844374.4, entitled "LINKAGE CONTROL SYSTEM AND METHOD, STORAGE MEDIUM, AND ELECTRONIC DEVICE" and filled on Sep. 6, 2019. The content of all of the above identified applications is incorporated herein by reference in its entirety.

FIELD

The present disclosure relates to the field of automation technologies, and specifically, to a linkage control system, a linkage control method, a computer-readable storage medium, and an electronic device.

BACKGROUND

In the related art, automation devices such as an access control device, a security door device, a video surveillance device, and a broadcasting device of a rail train station are managed discretely, operate separately, and have independent human-computer interaction interfaces. Most of the automation devices implement cross-platform linkage of various devices through common object request broker architecture (CORBA) message middleware. However, the CORBA message middleware cannot implement linkage of cross-regional devices. Moreover, when an emergency occurs, the devices cannot be linked in time, and the handling opportunity tends to be missed.

SUMMARY

A first aspect of the present disclosure provides a linkage control system, including a trigger access module, a linkage engine module, a linkage manner database, first message queuing telemetry transport (MQTT) middleware, and second MQTT middleware, N being an integer greater than zero, where
  the trigger access module is configured to obtain a linkage trigger signal, the linkage trigger signal being used for triggering a linkage action;
  the first MQTT middleware is respectively connected to the trigger access module and the linkage engine module, and is configured to send the linkage trigger signal obtained by the trigger access module to the linkage engine module;
  the linkage manner database is configured to store a linkage manner preset by a user, the linkage manner being in one-to-one correspondence with the linkage trigger signal, the linkage manner at least including a target device to be controlled and a control instruction corresponding to the target device;
  the linkage engine module is connected to the linkage manner database, and is configured to determine a target linkage manner corresponding to the linkage trigger signal from the linkage manner database according to the linkage trigger signal; and
  the second MQTT middleware is connected to the linkage engine module, and is configured to be connected to N devices, and send the control instruction corresponding to the target device to the target device according to the target linkage manner determined by the linkage engine module, so that the target device performs an action corresponding to the control instruction when receiving the control instruction, N being an integer greater than 0.

A second aspect of the present disclosure provides a linkage control method, including:
  obtaining a linkage trigger signal, the linkage trigger signal being used for triggering a linkage action;
  determining a target linkage manner corresponding to the linkage trigger signal according to the linkage trigger signal, the target linkage manner at least including a target device to be controlled and a control instruction corresponding to the target device; and
  sending the control instruction corresponding to the target device to the target device based on a message queuing telemetry transport (MQTT) communication protocol, so that the target device performs an action corresponding to the control instruction when receiving the control instruction.

By adopting the foregoing technical solutions, the trigger access module is configured to obtain the linkage trigger signal; the first MQTT middleware is connected to the trigger access module and the linkage engine module, and is configured to send the linkage trigger signal to the linkage engine module; the linkage manner database is configured to store a linkage manner preset by a user; the linkage engine module is connected to the linkage manner database, and is configured to determine a target linkage manner corresponding to the linkage trigger signal from the linkage manner database according to the linkage trigger signal; and the second MQTT middleware is connected to the linkage engine module, and is configured to be connected to N devices, and send the control instruction corresponding to the target device to the target device according to the target linkage manner determined by the linkage engine module, so that the target device performs an action corresponding to the control instruction when receiving the control instruction. In this case, by adopting MQTT middleware for signal transmission, the drawbacks in the related art that the use of CORBA message middleware for signal transmission cannot meet the cross-regional and cross-city requirements can be avoided, so that a plurality of cross-platform automation devices can be linked in time when an emergency occurs. In addition, by adopting MQTT middleware, the reliability of signal transmission is improved, signals are prevented from loss during transmission, and signals can be quickly sent and received in an emergency or during busy hour of messages.

A third aspect of the present disclosure provides a computer-readable storage medium, storing a computer program, the computer program, when executed by a processor, implementing the linkage control method described above.

When the computer program stored in the computer-readable storage medium in the embodiments of the present disclosure is executed by the processor, the drawbacks in the related art that the use of CORBA message middleware for signal transmission cannot meet the cross-regional and cross-city requirements can be avoided, so that a plurality of cross-platform automation devices can be linked in time when an emergency occurs, the reliability of signal transmission can be improved, signals are prevented from loss during transmission, and signals can be quickly sent and received in an emergency or during busy hour of messages.

A fourth aspect of the present disclosure provides an electronic device, including a memory, a processor, and a computer program stored in the memory, the processor, when executing the computer program, implementing the linkage control method described above.

When the processor of the electronic device in the embodiments of the present disclosure executes the computer program stored in the memory, the drawbacks in the related art that the use of CORBA message middleware for signal transmission cannot meet the cross-regional and cross-city requirements can be avoided, so that a plurality of cross-platform automation devices can be linked in time when an emergency occurs, the reliability of signal transmission can be improved, signals are prevented from loss during transmission, and signals can be quickly sent and received in an emergency or during busy hour of messages.

Other features and advantages of the present disclosure are described in detail in the following detailed description part.

BRIEF DESCRIPTION OF THE DRAWINGS

The foregoing and/or additional aspects and advantages of the present disclosure become apparent and comprehensible in the description made with reference to the following accompanying drawings.

DETAILED DESCRIPTION

Specific implementations of the present disclosure are described in detail below with reference to the accompanying drawings. It should be understood that the specific implementations described herein are merely used for describing and explaining the present disclosure, but are not intended to limit the present disclosure.

Figure 1:
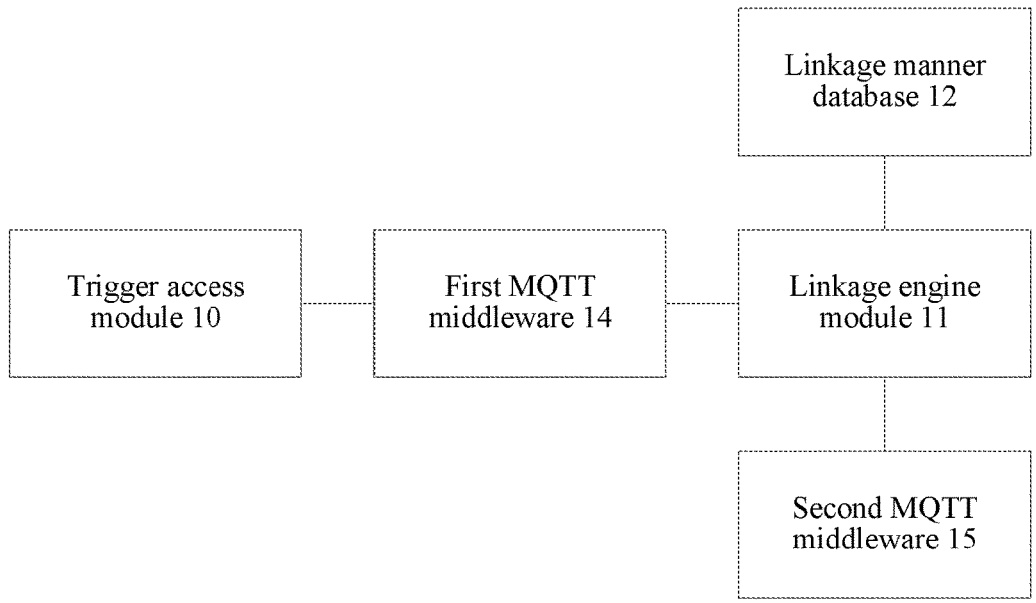
FIG. 1 is a block diagram of a linkage control system according to an embodiment of the present disclosure.

FIG. 1 is a block diagram of a linkage control system according to an embodiment of the present disclosure. As shown in FIG. 1, the system may include a trigger access module 10, a linkage engine module 11, a linkage manner database 12, first MQTT middleware 14, and second MQTT middleware 15, N being an integer greater than zero. The first MQTT middleware 14 and the second MQTT middleware 15 are both message middleware based on an MQTT communication protocol. Because the first MQTT middleware 14 and the second MQTT middleware 15 have different components connected at both ends, the first MQTT middleware 14 and the second MQTT middleware 15 are different MQTT middleware. In addition, the use of different MQTT middleware for transmitting signals or instructions between different components may accurately transmit the signals or instructions to corresponding components without miscommunication. In addition, "first" and "second" are merely used for distinguishing one element connected between different components from another element, and are not sequential or significant.

As shown in FIG. 1, the trigger access module 10 is connected to the linkage engine module 11 by the first MQTT middleware 14. The trigger access module 10 is configured to obtain a linkage trigger signal and send the obtained linkage trigger signal to the linkage engine module 11 through the first MQTT middleware 14. The linkage trigger signal represents a signal for triggering a linkage action.

The linkage trigger signal may include at least one of an event-type trigger signal, a time-type trigger signal, or a manual trigger signal.

In an embodiment, the linkage trigger signal is the event-type trigger signal, and the event is a user-preset event that triggers linkage, which may be, for example, but not limited to, a fire event, a flood event, or a high temperature event.

Figure 2:
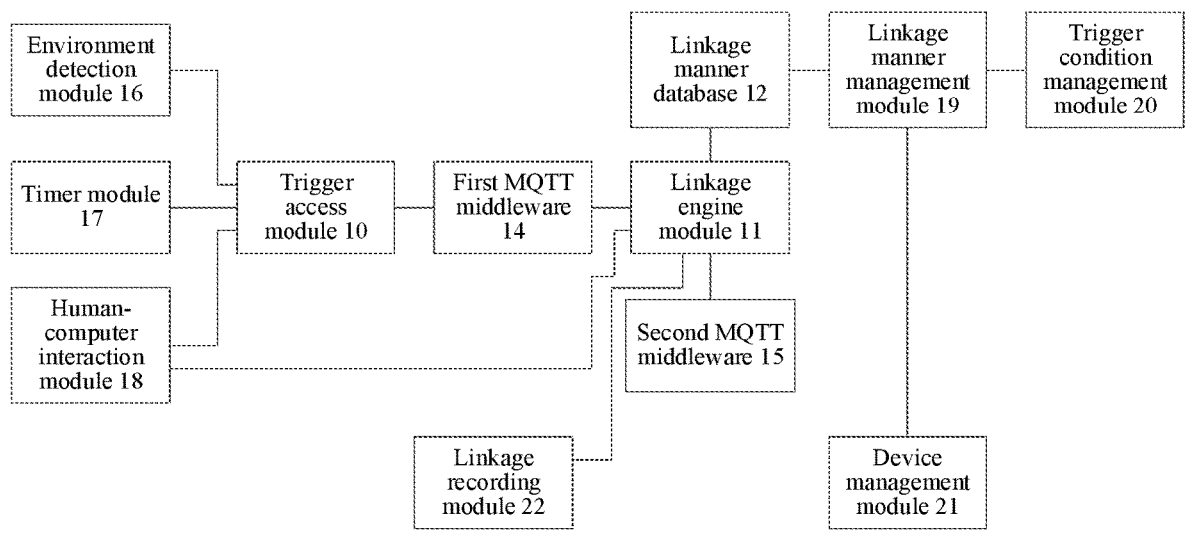
FIG. 2 is a block diagram of a linkage control system according to another embodiment of the present disclosure.

FIG. 2 is a block diagram of a linkage control system according to another embodiment of the present disclosure. In this embodiment, referring to FIG. 2, the system may further include an environment detection module 16. The environment detection module 16 may include, but not limited to, at least one of a smoke sensor, a water level sensor, or a temperature sensor.

As shown in FIG. 2, the environment detection module 16 is connected to the trigger access module 10. The environment detection module 16 is configured to send, in a case that an event signal satisfying a linkage trigger condition is detected, the event signal to the trigger access module 10, so that the trigger access module 10 generates the event-type trigger signal, the linkage trigger condition being a condition preset by the user for triggering the linkage action.

For example, assuming that the linkage trigger condition preset by the user is a fire event, when the smoke sensor in the environment detection module 16 detects that a smoke concentration is greater than a preset concentration, it may be determined that a fire event occurs at this time. That is, the environment detection module 16 may detect a fire event signal satisfying the linkage trigger condition, and send the fire event signal to the trigger access module 10. The trigger access module 10 generates a fire linkage trigger signal according to the received fire event signal, and sends the fire linkage trigger signal to the linkage engine module 11 through the first MQTT middleware 14.

In another embodiment, the linkage trigger signal is the time-type trigger signal, and the time is a time preset by the user for triggering the linkage action, which may be, for example, 8:00, 17:00, or the like every day. In this embodiment, the system may further include a timer module 17.

As shown in FIG. 2, the timer module 17 is connected to the trigger access module 10. The timer module 17 is configured to send, in a case that a time signal satisfying the linkage trigger condition is detected, the time signal to the trigger access module 10, so that the trigger access module 10 generates the time-type trigger signal.

For example, it is assumed that the linkage trigger condition preset by the user is a time during a peak period of subway traffic. For example, the peak time of subway traffic is usually 8:00 and 17:00 every day. When the timer module 17 detects that the time reaches 8:00 or 17:00, that is, when the timer module 17 detects a time signal satisfying the linkage trigger condition, and sends the time signal to the trigger access module 10, the trigger access module 10 generates the time-type trigger signal according to the received time signal, and sends the time-type trigger signal to the linkage engine module 11 through the first MQTT middleware 14.

In still another embodiment, the linkage trigger signal is the manual trigger signal. In this embodiment, to implement manual trigger linkage, the system may further include a human-computer interaction module 18. As shown in FIG.

2, the human-computer interaction module 18 is connected to the trigger access module 10. When the user performs a preset trigger action on the human-computer interaction module 18, the human-computer interaction module 18 sends an operation signal of the user to the trigger access module 10, so that the trigger access module 10 generates a manual trigger signal according to the operation signal of the user. Considering that the user is more familiar with a Web (world wide web (WWW)) interface than a Qt graphical user interface (a GUI developed by the Qt Company), the human-computer interaction module 18 includes a human-computer interaction interface, and the interface may be a Web page interface. In this way, the user can become skilled at operating in the human-computer interaction module 18 without excessive learning costs.

For example, it is assumed that a function button for triggering linkage is preset in the human-computer interaction module 18, and the function button may include, but not limited to, at least one of a fire function button, a flood function button, or a high temperature function button. For example, when the user presses the flood function button, the human-computer interaction module 18 detects a manual operation signal that the user presses the flood function button, and sends the manual operation signal to the trigger access module 10. The trigger access module 10 generates a flood linkage trigger signal according to the manual operation signal, and sends the flood linkage trigger signal to the linkage engine module 11 through the first MQTT middleware 14.

It is to be noted that, the linkage trigger signal may also include a plurality of signals in the above three, and the specific implementation is the same as that described above. Details are not repeated herein again.

Through the above technical solutions, the linkage may be triggered by different triggering methods, so that the linkage control system is more flexible and can meet the different requirements of users.

The linkage manner database 12 is configured to store a linkage manner preset by a user, the linkage manner being in one-to-one correspondence with the linkage trigger signal, and the linkage manner at least including a target device to be controlled and a control instruction corresponding to the target device.

For example, if there is a linkage trigger signal 1, the linkage manner database 12 may store a linkage manner A corresponding to the linkage trigger signal 1. A target device to be controlled included in the linkage manner A may be an access control device, a security door device, or a video surveillance device. Moreover, a control instruction corresponding to the access control device is a closing instruction, a control instruction corresponding to the security door device is an opening instruction, a control instruction corresponding to the video surveillance device is an opening instruction, or the like, which is not limited thereto. It is to be noted that, the present disclosure takes the linkage manner database 12 including one linkage manner as an example for description, and the linkage manner database 12 including a plurality of linkage manners is also applicable to the present disclosure.

The linkage engine module 11 is connected to the linkage manner database 12. The linkage engine module 11 is configured to determine a target linkage manner corresponding to the linkage trigger signal from the linkage manner database 12 according to the linkage trigger signal. The second MQTT middleware 15 is connected to the linkage engine module 11 and N devices. The second MQTT middleware 15 is configured to send the control instruction corresponding to the target device to the target device according to the target linkage manner determined by the linkage engine module 11, so that the target device performs an action corresponding to the control instruction when receiving the control instruction, N being an integer greater than 0.

Because the linkage manner stored in the linkage manner database 12 is in one-to-one correspondence with the linkage trigger signal, after the linkage trigger signal is known in the linkage engine module 11, the target linkage manner corresponding to the linkage trigger signal can be determined from the linkage manner database 12. It should be known to a person skilled in the art that the target device included in the target linkage manner refers to one or more devices in the N devices above.

By adopting the foregoing technical solutions, it is possible to perform comprehensive management on N devices, implement interconnection and intercommunication for emergency events, and improve the automation of device management. In addition, because signals between the trigger access module and the linkage engine module, as well as between the linkage engine module and the target device are all transmitted through MQTT middleware, the drawbacks in the related art that the use of CORBA message middleware for signal transmission cannot meet the cross-regional and cross-city requirements can be avoided. In addition, by adopting MQTT middleware, the reliability of signal transmission is improved, signals are prevented from loss during transmission, and signals can be quickly sent and received in an emergency or during busy hour of messages.

It is to be noted that, the linkage manner mentioned above is preset by the user according to actual requirements. In an embodiment, the user may update the linkage manner in real time through a human-computer interaction interface. For example, the user may perform editing on the human-computer interaction interface to update the linkage manner.

In another embodiment, the linkage control system may further include a linkage manner management module 19 providing the user with an interface for editing the linkage manner, and the user updates the linkage manner through the linkage manner management module 19.

For example, as shown in FIG. 2, the linkage manner management module 19 is connected to the linkage manner database 12, and the linkage manner management module 19 is configured to provide the user with an interface for editing the linkage manner, so that the user can edit the linkage manner in the linkage manner management module 19 through the interface. Specifically, the editing the linkage manner may include: adding a linkage manner, or modifying, checking or deleting a linkage manner stored in the linkage manner database 12, and configuring a linkage trigger signal corresponding to the linkage manner, or the like. For example, assuming that the linkage trigger signal corresponding to the linkage manner A stored in the linkage manner database 12 is a fire linkage trigger signal, the user may modify the linkage trigger signal corresponding to the linkage manner A to a flood linkage trigger signal through the linkage manner management module 19, or the like. After the user edits the linkage manner in the linkage manner management module 19, an edited linkage manner may also be stored in the linkage manner database 12, so that the linkage engine module 11 can determine the target linkage manner from the linkage manner database 12.

It is to be noted that, the user may also define a type of the linkage trigger signal in the linkage manner management module 19, where the linkage trigger signal may be at least one of the event-type trigger signal, the time-type trigger signal, or the manual trigger signal mentioned above, and configure a linkage trigger signal type for each linkage manner, or the like. The configuring a linkage trigger signal type for each linkage manner may be, for example, configuring a linkage trigger signal type corresponding to a linkage manner A as an event type, configuring a linkage trigger signal type corresponding to a linkage manner B as a time type, and configuring a linkage trigger signal type corresponding to a linkage manner C as a manual type, or the like, which is not specifically limited in the present disclosure.

In an embodiment, the linkage trigger condition preset by the user may be complex. The event-type trigger signal is used as an example. Because the linkage trigger signal is the event-type trigger signal, a linkage trigger condition preset by the user is also of an event type. Assuming that the environment detection module 16 mentioned above includes ten smoke sensors, a linkage trigger condition may be that smoke concentrations detected by at least five smoke sensors of the ten smoke sensors are greater than the preset concentration. Alternatively, when the linkage trigger signal is the time-type trigger signal, a linkage trigger condition preset by the user is also of a time type. It is assumed that the time in the linkage trigger condition set by the user is complex and irregular. In such a case, it may be complex to configure a linkage trigger signal corresponding to the linkage manner directly through the linkage manner management module 19. To avoid the problem, in the present disclosure, the linkage control system may further include a trigger condition management module 20. As shown in FIG. 2, the trigger condition management module 20 is connected to the linkage manner management module 19, and is configured to provide the user with an interface for setting the linkage trigger condition, and store the linkage trigger condition in the trigger condition management module after the user has set the linkage trigger condition. In this way, when the user configures the linkage trigger signal corresponding to the linkage manner, the configuration may be performed based on the linkage trigger condition stored in the trigger condition management module 20. For example, if the linkage trigger condition may be that smoke concentrations detected by at least five smoke sensors of the ten smoke sensors are greater than the preset concentration, at least five linkage trigger signals may correspond to one linkage manner during configuration.

By adopting the foregoing technical solutions, the trigger condition management module 20 is disposed in the linkage control system, making it convenient for the user to set different linkage trigger conditions, and further configure the linkage trigger signal corresponding to the linkage manner according to the linkage trigger condition subsequently.

In an embodiment, as shown in FIG. 2, the linkage control system may further include a device management module 21. The device management module 21 is connected to the linkage manner management module 19 and N devices. The device management module 21 is configured to classify and manage the N devices, so that the user can conveniently find the devices included in the linkage manner when editing the linkage manner.

In an actual application, considering that a large number of devices may be included in the linkage control system, making it inconvenient for the user to find the devices that each linkage manner needs to include in time, in the present disclosure, a device management system 21 is disposed in the linkage control system. The user may classify the N devices in the device management system 21. For example, surveillance devices may include a camera and a monitor, and access devices may include a security door device, an access control device, and the like. When the user edits a linkage manner corresponding to a fire linkage trigger signal, considering the need to evacuate the crowd, it is necessary to control a security door to open. In this case, the user only needs to find the security door device among the access devices. Compared with finding the security door device among the N devices, it is more convenient and faster to find the security door device among the access devices. In this way, the user may quickly edit the linkage manner according to the method above.

In addition, as shown in FIG. 2, the linkage control system may further include a linkage recording module 22. The linkage recording module 22 is connected to the linkage engine module 11. The linkage recording module 22 is configured to be connected to the N devices, and record the target linkage manner determined by the linkage engine module 11 and an execution result of the target device after receiving the control instruction. The execution result may be whether the target device successfully executes the control instruction or fails to execute the control instruction successfully. In this way, a historical linkage record is recorded in the linkage recording module 22, to facilitate subsequent viewing by the user.

The implementation process of comprehensively controlling a plurality of devices is described in detail below.

In an embodiment, the linkage manner may further include a linkage execution type. The linkage execution type may include an automatic execution type or a semi-automatic execution type. The automatic execution type means that the linkage engine module 11 automatically sends a control instruction to the target device without participation of the user. The semi-automatic execution type means that the linkage engine module 11 sends a control instruction to the target device only after receiving a confirmation instruction inputted by the user.

In an embodiment, the linkage execution type included in the target linkage manner determined by the linkage engine module 11 is an automatic execution type. In this embodiment, after determining the target linkage manner, the linkage engine module 11 sends the control instruction corresponding to the target device to the target device through the second MQTT middleware 15, so that the target device performs an action corresponding to the control instruction when receiving the control instruction.

Figure 3:
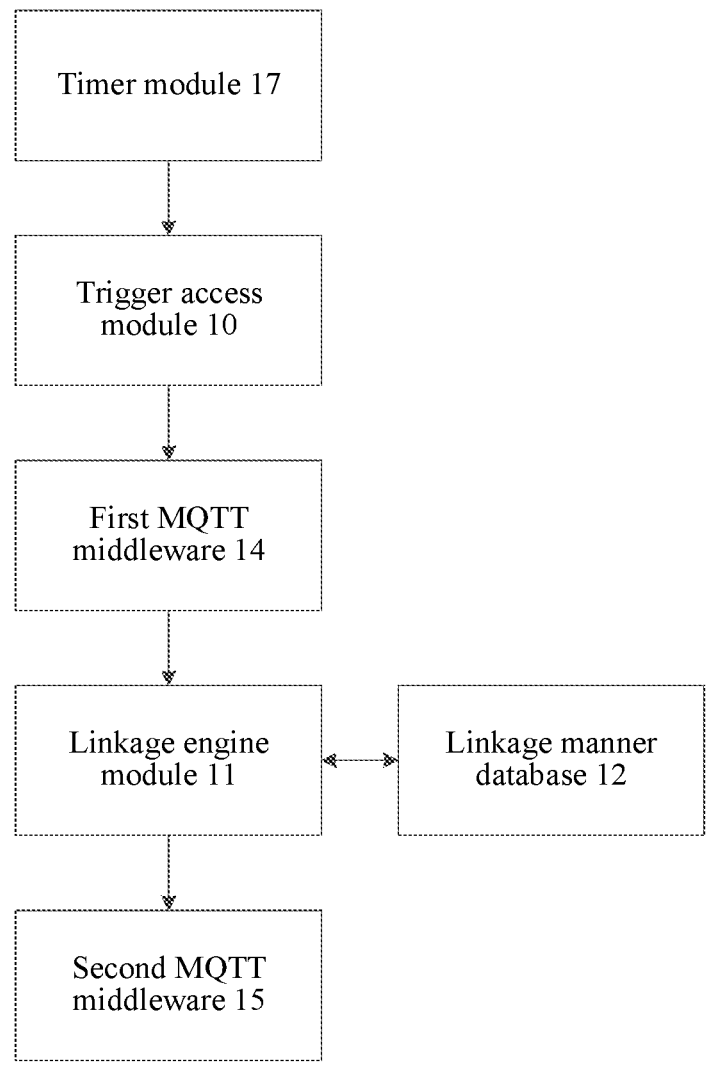
FIG. 3 is a schematic diagram of a linkage control system according to an embodiment of the present disclosure.

For example, as shown in FIG. 3, assuming that the linkage trigger signal is the time-type trigger signal, when detecting that the time reaches preset time, the timer module 17 sends a time signal to the trigger access module 10. The trigger access module 10 generates a time-type trigger signal according to the time signal, and sends the time-type trigger signal to the linkage engine module 11 through the first MQTT middleware 14, so that the linkage engine module 11 finds a linkage manner corresponding to the time-type trigger signal in the linkage manner database 12, and sends a corresponding control instruction to the target device through the second MQTT middleware 15.

In another embodiment, the linkage execution type included in the target linkage manner determined by the linkage engine module 11 is a semi-automatic execution type. In this embodiment, the target linkage manner further includes a target alarm mode, and as shown in FIG. 2, the system may further include a human-computer interaction module 18.

To avoid sending the control instruction by mistake, the confirmation of the user needs to be obtained before the linkage engine module 11 sends the control instruction to the target device. Therefore, in the present disclosure, when determining the target linkage manner, the linkage engine module 11 also needs to send an alarm signal to the user, to remind the user whether to send a control instruction to the target device. As shown in FIG. 2, the linkage engine module 11 is connected to the human-computer interaction module 18, and is configured to send an alarm signal to the human-computer interaction module 18 according to the target alarm mode when the target linkage manner is determined, receive a feedback signal of the user for the alarm signal, send the control instruction corresponding to the target device to the target device through the second MQTT middleware 15 in a case that the feedback signal is a confirmation signal, and prohibit sending the control instruction corresponding to the target device to the target device in a case that the feedback signal is a cancellation signal. The target alarm mode may be a pop-up window alarm mode, an email alarm mode, or the like.

For example, a window may pop up in the human-computer interaction module 18, and the window includes a confirmation function button and a cancellation function button. When the user clicks the confirmation function button, the linkage engine module 11 may receive a feedback signal representing the confirmation signal, and then the linkage engine module 11 sends the control instruction to the target device. When the user clicks the cancellation function button, the linkage engine module 11 may receive a feedback signal representing the cancellation signal, and then the linkage engine module 11 prohibits sending the control instruction to the target device. Alternatively, a pop-up window may further include the target device and the control instruction corresponding to the target device, so that the user can confirm whether the target device and the control instruction are accurate, or the like.

Figure 4:
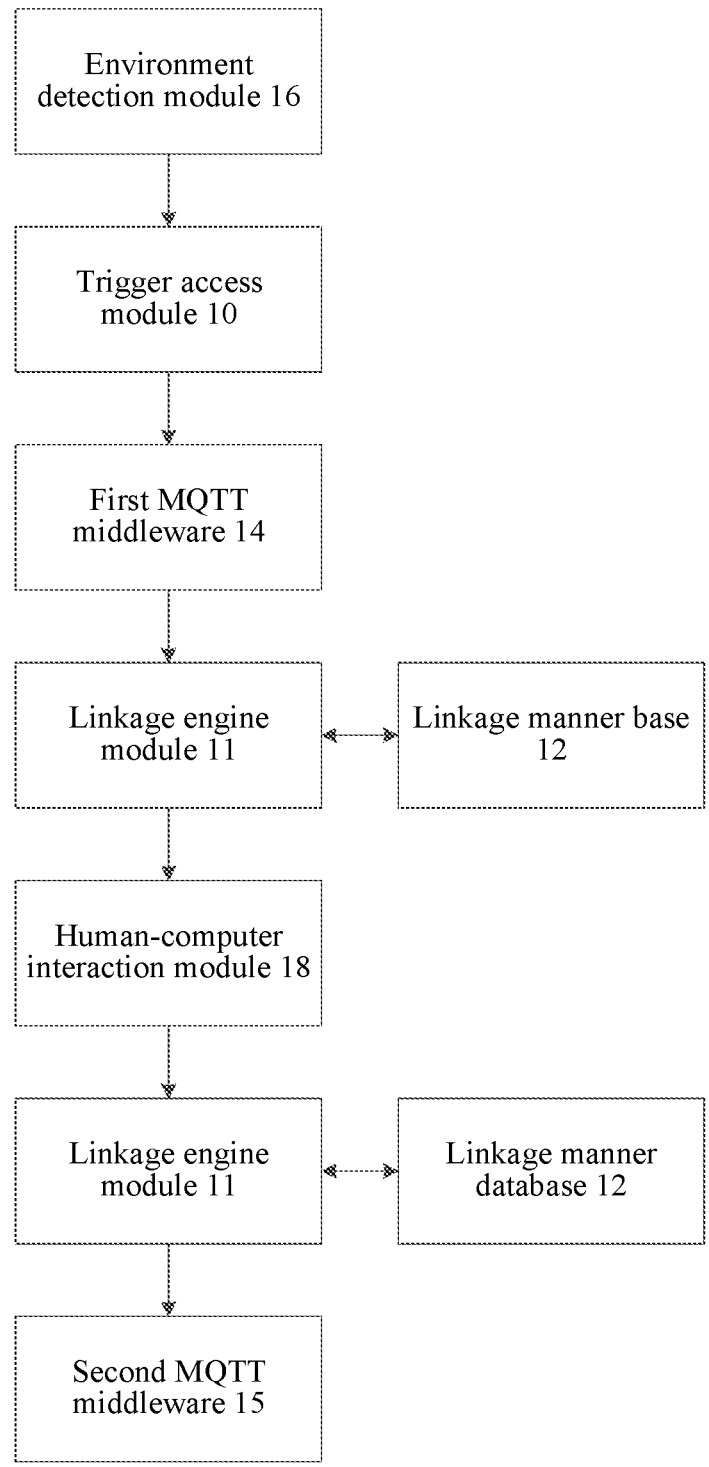
FIG. 4 is a schematic diagram of a linkage control system according to another embodiment of the present disclosure.

For example, as shown in FIG. 4, assuming that the linkage trigger signal is the event-type trigger signal, when detecting an event signal satisfying the linkage trigger condition, the environment detection module 16 sends the event signal to the trigger access module 10, so that the trigger access module 10 generates the event-type trigger signal. For example, when detecting that a smoke concentration is higher than a preset concentration, a smoke sensor sends a fire event signal to the trigger access module 10, so that the trigger access module 10 generates a fire linkage trigger signal. Alternatively, when detecting that a water level is higher than a preset water level, a water level sensor sends a flood event signal to the trigger access module 10, so that the trigger access module 10 generates a flood linkage trigger signal. Alternatively, when detecting that a temperature is higher than a preset temperature, a temperature sensor sends a high temperature signal to the trigger access module 10, so that the trigger access module 10 generates a high-temperature linkage trigger signal.

After generating the linkage trigger signal according to the method above, the trigger access module 10 sends the linkage trigger signal to the linkage engine module 11 through the first MQTT middleware 14. After receiving the linkage trigger signal, the linkage engine module 11 determines the target linkage manner corresponding to the linkage trigger signal in the linkage manner database 12, and then sends an alarm signal to the human-computer interaction module 18 according to an alarm mode included in the target linkage manner, so that the user confirms whether to send the control instruction. When the user confirms sending the control instruction, the human-computer interaction module 18 sends the feedback signal representing the confirmation signal to the linkage engine module 11. When receiving the feedback signal representing the confirmation signal, the linkage engine module 11 sends the corresponding control instruction to the target device included in the target linkage manner through the second MQTT middleware 15, so that the target device performs an action corresponding to the control instruction.

It is to be noted that, the linkage execution type may be alternatively a manual execution type. In this embodiment, the trigger access module 10 does not need to obtain the linkage trigger signal, and the linkage engine module 11 does not need to determine the target linkage manner corresponding to the linkage trigger signal from the linkage manner database 12 according to the linkage trigger signal. Instead, it is only necessary to perform subsequent operations based on the target device and the control instruction inputted by the user. Specifically, the user directly selects a target device to be controlled and a control instruction corresponding to the target device in the linkage manner database 12 through the human-computer interaction module 18, and sends the target device and the control instruction corresponding to the target device to the linkage engine module 11 through the human-computer interaction module 18, so that the linkage engine module 11 sends the corresponding control instruction to the target device included in the target linkage manner through the second MQTT middleware 15, and the target device performs an action corresponding to the control instruction.

Generally, M target devices are included in the target linkage manner, M being an integer greater than 1 and less than or equal to N. To facilitate the orderly execution of corresponding actions by the target devices, in the present disclosure, the target linkage manner further includes execution time for each target device to execute the control instruction corresponding to the target device. In this way, when receiving the control instruction sent by the linkage engine module 11, the second MQTT middleware 15 sends the control instruction corresponding to the target device to the target device according to a sequence of the execution time corresponding to the M target devices. For example, a target device 1 corresponds to execution time 1, a target device 2 corresponds to execution time 2, and a target device 3 corresponds to execution time 3. Moreover, the execution time 1 is earlier than the execution time 2, and the execution time 2 is earlier than the execution time 3. The second MQTT middleware 15 first sends a control instruction corresponding to the target device 1 to the target device 1, then sends a control instruction corresponding to the target device 2 to the target device 2, and finally sends a control instruction corresponding to the target device 3 to the target device 3. In this way, the M target devices can receive the control instructions according to the sequence of the execution time, to ensure that the M target devices perform corresponding actions in sequence.

It is to be noted that, when sending a control instruction, the second MQTT middleware 15 may perform a series of operations such as authentication, encryption, and packing on the control instruction. The series of authentication, encryption, and packing belongs to the prior art. Details are not repeated herein again.

By adopting the foregoing technical solutions, it is possible to implement comprehensive management of various devices, and use a single human-computer interaction module to link the various devices, which can effectively improve the intelligence level of the linkage control system.

Figure 5:
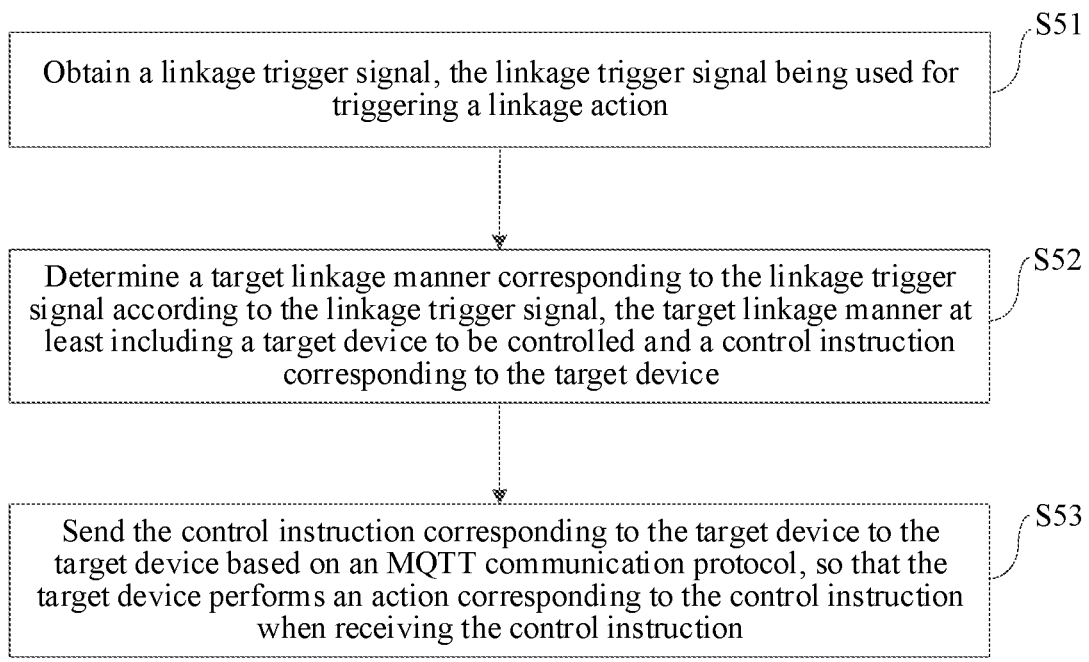
FIG. 5 is a flowchart of a linkage control method according to an embodiment of the present disclosure.

Based on the same invention idea, the present disclosure further provides a linkage control method. FIG. 5 is a flowchart of a linkage control method according to an embodiment of the present disclosure. As shown in FIG. 5, the method may include the following steps.

S51: Obtain a linkage trigger signal, the linkage trigger signal being used for triggering a linkage action.

S52: Determine a target linkage manner corresponding to the linkage trigger signal according to the linkage trigger signal, the target linkage manner at least including a target device to be controlled and a control instruction corresponding to the target device.

S53: Send the control instruction corresponding to the target device to the target device based on an MQTT communication protocol, so that the target device performs an action corresponding to the control instruction when receiving the control instruction.

In an embodiment, the linkage manner may further include a linkage execution type. The linkage execution type may include at least one of an automatic execution type or a semi-automatic execution type. The target linkage manner further includes a target alarm mode in a case that the linkage execution type included in the target linkage manner is the semi-automatic execution type, and the method further includes:

sending an alarm signal according to the target alarm mode when the target linkage manner is determined;
receiving a feedback signal of a user for the alarm signal; and
the sending the control instruction corresponding to the target device to the target device based on an MQTT communication protocol includes:
sending the control instruction corresponding to the target device to the target device based on the MQTT communication protocol in a case that the feedback signal is a confirmation signal; and
prohibiting sending the control instruction corresponding to the target device to the target device in a case that the feedback signal is a cancellation signal.

In an embodiment, the linkage trigger signal includes at least one of an event-type trigger signal, a time-type trigger signal, or a manual trigger signal.

In an embodiment, the linkage trigger signal is the event-type trigger signal, and the method further includes:

detecting an event signal satisfying a linkage trigger condition, the linkage trigger condition being a condition preset by the user for triggering the linkage action; and
generating the event-type trigger signal according to the event signal.

Alternatively, the linkage trigger signal is the time-type trigger signal, and the method further includes:

detecting a time signal satisfying the linkage trigger condition; and
generating the time-type trigger signal according to the time signal.

Optionally, M target devices are included in the target linkage manner, M being an integer greater than 1; the target linkage manner further includes execution time of each target device executing the control instruction corresponding to the target device; and
the sending the control instruction corresponding to the target device to the target device based on an MQTT communication protocol includes:
sending the control instruction corresponding to the target device to the target device according to a sequence of the execution time corresponding to the M target devices.

The present disclosure further provides a computer-readable storage medium, storing a computer program, the computer program, when executed by a processor, implementing the linkage control method described above.

When the computer program stored in the computer-readable storage medium in the embodiments of the present disclosure is executed by the processor, the drawbacks in the related art that the use of CORBA message middleware for signal transmission cannot meet the cross-regional and cross-city requirements can be avoided, so that a plurality of cross-platform automation devices can be linked in time when an emergency occurs, the reliability of signal transmission can be improved, signals are prevented from loss during transmission, and signals can be quickly sent and received in an emergency or during busy hour of messages.

In addition, the present disclosure further provides an electronic device, including a memory, a processor, and a computer program stored in the memory, the processor, when executing the computer program, implementing the linkage control method described above.

When the processor of the electronic device in the embodiments of the present disclosure executes the computer program stored in the memory, the drawbacks in the related art that the use of CORBA message middleware for signal transmission cannot meet the cross-regional and cross-city requirements can be avoided, so that a plurality of cross-platform automation devices can be linked in time when an emergency occurs, the reliability of signal transmission can be improved, signals are prevented from loss during transmission, and signals can be quickly sent and received in an emergency or during busy hour of messages. The specific implementation of the steps in the foregoing embodiments is already described in detail in the embodiments related to the system. Details are not described herein again.

The present disclosure is not limited to specific details in the foregoing implementations. Within the scope of the technical idea of the present disclosure, a plurality of simple variations may be made to the technical solutions of the present disclosure, and these simple variations all fall within the protection scope of the present disclosure.

It should be additionally noted that, the specific technical features described in the foregoing specific implementations may be combined in any appropriate manner without conflict. To avoid unnecessary repetition, various possible combination manners are not described in the present disclosure.

In addition, different implementations of the present disclosure may also be arbitrarily combined without departing from the idea of the present disclosure, and these combinations shall still be regarded as content disclosed in the present disclosure.

What is claimed is:

1. A linkage control system for communicating linkage trigger signals to devices, the linkage control system comprising a processor and a memory configured to store instructions and configured as a linkage manner database that stores a linkage manner set by a user, wherein the processor is configured to execute the instructions to form a trigger access module, a linkage engine module, a human-computer interaction module, first message queuing telemetry transport (MQTT) middleware, and second MQTT middleware, wherein the trigger access module is configured to obtain a linkage trigger signal, the linkage trigger signal being used for triggering a linkage action;

the first MQTT middleware is connected to the trigger access module and the linkage engine module, and is configured to send the linkage trigger signal obtained by the trigger access module to the linkage engine module;

the linkage manner comprises a one-to-one correspondence with the linkage trigger signal, at least a target device to be controlled and a control instruction corresponding to the target device, and a linkage execution type that comprises an automatic execution type or a semi-automatic execution type;

the linkage engine module is connected to the linkage manner database and the human-computer interaction module, and is configured to determine a target linkage manner corresponding to the linkage trigger signal from the linkage manner database according to the linkage trigger signal;

in response to that the target linkage manner comprises a target alarm mode and that the linkage execution type is the semi-automatic execution type, the linkage engine module is configured to send an alarm signal to the human-computer interaction module according to the target alarm mode when the target linkage manner is determined, receive a feedback signal of the human-computer interaction module for the alarm signal, send the control instruction to the target device through the second MQTT middleware when the feedback signal is a confirmation signal, and prohibit sending the control instruction to the target device when the feedback signal is a cancellation signal;

the human-computer interaction module is connected to the linkage engine module, and is configured to receive the alarm signal and send the feedback signal for the alarm signal to the linkage engine module; and the second MQTT middleware is connected to the linkage engine module, and is configured to be connected to N devices and to send the control instruction to the target device according to the target linkage manner determined by the linkage engine module, and the target device performs an action corresponding to the control instruction when receiving the control instruction, N being an integer greater than 0.

2. The linkage control system according to claim 1, wherein the linkage trigger signal comprises at least one of an event-type trigger signal, a time-type trigger signal, or a manual trigger signal.

3. The linkage control system according to claim 2, wherein in a case that the linkage trigger signal is the event-type trigger signal, the processor is configured to execute the instructions to form an environment detection module, the environment detection module being connected to the trigger access module, and being configured to send, in a case that an event signal satisfying a linkage trigger condition is detected, the event signal to the trigger access module, the trigger access module generating the event-type trigger signal, and the linkage trigger condition being a condition set by the user for triggering the linkage action; or in a case that the linkage trigger signal is the time-type trigger signal, the system further comprises a timer module, the timer module being connected to the trigger access module, and being configured to send, in a case that a time signal satisfying the linkage trigger condition is detected, the time signal to the trigger access module, and the trigger access module generating the time-type trigger signal.

4. The linkage control system according to claim 1, wherein the processor is configured to execute the instructions to further form a linkage manner management module, the linkage manner management module connected to the linkage manner database, and configured to provide the user with an interface for editing the linkage manner, and store an edited linkage manner in the linkage manner database.

5. The linkage control system according to claim 4, wherein the processor is configured to execute the instructions to further form a trigger condition management module, the trigger condition management module connected to the linkage manner management module, and configured to provide the user with an interface for setting the linkage trigger condition, and store the linkage trigger condition, to allow the user to configure the linkage trigger signal corresponding to the linkage manner according to the linkage trigger condition.

6. The linkage control system according to claim 4, wherein the processor is configured to execute the instructions to further form a device management module, the device management module connected to the linkage manner management module and the N devices, and configured to classify and manage the N devices.

7. The linkage control system according to claim 1, wherein the processor is configured to execute the instructions to further form a linkage recording module, the linkage recording module connected to the linkage engine module, and configured to be connected to the N devices, and record the target linkage manner and an execution result of the target device after receiving the control instruction.

8. The linkage control system according to claim 1, wherein the target linkage manner comprises M target devices, M being an integer greater than 1 and less than or equal to N;

the target linkage manner further comprises an execution time of each target device executing the control instruction; and the second MQTT middleware is configured to send the control instruction to the target device according to a sequence of the execution time corresponding to the M target devices.

9. A linkage control method for communicating linkage trigger signals to devices, the linkage control method comprising:

obtaining a linkage trigger signal, the linkage trigger signal being used for triggering a linkage action;

determining a target linkage manner corresponding to the linkage trigger signal according to the linkage trigger signal, the target linkage manner at least comprising a target device to be controlled and a control instruction corresponding to the target device, and a linkage execution type that comprises an automatic execution type or a semi-automatic execution type;

in response to that the target linkage manner comprises a target alarm mode and that the linkage execution type is the semi-automatic execution type, sending an alarm signal according to the target alarm mode when the target linkage manner is determined, receiving a feedback signal for the alarm signal, sending the control instruction to the target device when the feedback signal is a confirmation signal, and prohibiting sending the control instruction to the target device when the feedback signal is a cancellation signal; and sending the control instruction to the target device based on a message queuing telemetry transport (MQTT) communication protocol, and the target device performing an action corresponding to the control instruction when receiving the control instruction.

10. A non-transitory computer-readable storage medium for communicating linkage trigger signals to devices, the non-transitory computer-readable storage medium storing a computer program, the computer program, when executed by a processor, causing the processor to perform operations comprising:

obtaining a linkage trigger signal, the linkage trigger signal being used for triggering a linkage action;

determining a target linkage manner corresponding to the linkage trigger signal according to the linkage trigger signal, the target linkage manner at least comprising a target device to be controlled and a control instruction corresponding to the target device, and a linkage execution type that comprises an automatic execution type or a semi-automatic execution type;

in response to that the target linkage manner comprises a target alarm mode and that the linkage execution type is the semi-automatic execution type, sending an alarm signal according to the target alarm mode when the target linkage manner is determined, receiving a feedback signal for the alarm signal, sending the control instruction to the target device when the feedback signal is a confirmation signal, and prohibiting sending the control instruction to the target device when the feedback signal is a cancellation signal; and sending the control instruction to the target device based on a message queuing telemetry transport (MQTT) communication protocol, and the target device performing an action corresponding to the control instruction when receiving the control instruction.

11. An electronic device, comprising a memory, a processor, and a computer program stored in the memory, the processor, when executing the computer program, implementing the linkage control method according to claim 9.

* * * * *